(12) United States Patent
Colton et al.

(10) Patent No.: US 8,819,539 B1
(45) Date of Patent: Aug. 26, 2014

(54) ON-THE-FLY REWRITING OF UNIFORM RESOURCE LOCATORS IN A WEB-PAGE

(75) Inventors: Paul Colton, Hillsborough, CA (US); Uri Sarid, Menlo Park, CA (US); Kevin Edward Lindsey, Benbrook, TX (US)

(73) Assignee: Appcelerator, Inc., Mountain View, CA (US)

(*) Notice: Subject to any disclaimer, the term of this patent is extended or adjusted under 35 U.S.C. 154(b) by 340 days.

(21) Appl. No.: 12/325,249

(22) Filed: Nov. 30, 2008

Related U.S. Application Data

(60) Provisional application No. 60/991,769, filed on Dec. 3, 2007.

(51) Int. Cl.
*G06F 17/00* (2006.01)

(52) U.S. Cl.
USPC ............ 715/208; 715/205; 715/234; 707/755

(58) Field of Classification Search
USPC .............. 715/205, 208; 707/10, 705; 709/218
See application file for complete search history.

(56) References Cited

U.S. PATENT DOCUMENTS

| | | |
|---|---|---|
| 4,989,132 A | 1/1991 | Mellender et al. |
| 5,361,351 A | 11/1994 | Lenkov et al. |
| 5,448,740 A | 9/1995 | Kiri et al. |
| 5,812,851 A | 9/1998 | Levy et al. |
| 5,821,851 A | 10/1998 | Blackmer |
| 5,878,223 A | 3/1999 | Becker et al. |
| 6,067,413 A | 5/2000 | Gustafsson et al. |
| 6,144,962 A | 11/2000 | Weinberg et al. |
| 6,185,587 B1 | 2/2001 | Bernardo et al. |
| 6,192,382 B1 | 2/2001 | Lafer et al. |
| 6,240,414 B1 | 5/2001 | Beizer et al. |
| 6,324,686 B1 | 11/2001 | Komatsu et al. |
| 6,356,283 B1 | 3/2002 | Guedalia |
| 6,381,737 B1 | 4/2002 | Click, Jr. et al. |
| 6,453,335 B1 | 9/2002 | Kaufmann |
| 6,539,433 B1 | 3/2003 | Tominaga et al. |
| 6,609,246 B1 | 8/2003 | Guhr et al. |
| 6,684,369 B1 | 1/2004 | Bernardo et al. |
| 6,779,114 B1 | 8/2004 | Chow et al. |
| 6,915,454 B1 | 7/2005 | Moore et al. |
| 6,941,562 B2 | 9/2005 | Gao et al. |
| 6,981,215 B1 | 12/2005 | Lindhorst et al. |
| 6,990,653 B1 | 1/2006 | Burd et al. |
| 7,000,008 B2 | 2/2006 | Bautista-Lloyd et al. |
| 7,047,318 B1 | 5/2006 | Svedloff |
| 7,051,084 B1 | 5/2006 | Hayton et al. |
| 7,058,633 B1 * | 6/2006 | Gnagy et al. ............ 707/999.001 |
| 7,062,506 B2 | 6/2006 | Taylor et al. |

(Continued)

OTHER PUBLICATIONS

Anonymous, Creating Accessible JavaScript—JavaScript Event Handlers, published at http://webaim.org/techniques/javascript/eventhandlers.*

(Continued)

*Primary Examiner* — Stephen Hong
*Assistant Examiner* — Keith Bloomquist
(74) *Attorney, Agent, or Firm* — Staniford Tomita LLP

(57) ABSTRACT

A system and method for on-the-fly rewriting of a plurality of URLs in a Web-page is disclosed herein. On a server-side, the present invention analyzes a plurality of hyperlinks of the Web-page and optimizes the plurality of hyperlinks of the Web-page to generate an optimized Web-page, which is then transmitted to a client-side.

18 Claims, 12 Drawing Sheets

(56) References Cited

U.S. PATENT DOCUMENTS

| | | | |
|---|---|---|---|
| 7,086,041 B2 | 8/2006 | Plesko et al. |
| 7,103,600 B2 | 9/2006 | Mullins |
| 7,103,881 B2 | 9/2006 | Stone |
| 7,117,504 B2 | 10/2006 | Smith et al. |
| 7,124,445 B2 | 10/2006 | Cronce et al. |
| 7,139,798 B2 | 11/2006 | Zircher et al. |
| 7,143,136 B1 | 11/2006 | Drenan et al. |
| 7,167,862 B2 | 1/2007 | Mullins |
| 7,213,231 B1 | 5/2007 | Bandhole et al. |
| 7,222,336 B2 | 5/2007 | Willis |
| 7,231,644 B2 | 6/2007 | Kieffer |
| 7,269,636 B2 | 9/2007 | McCollum et al. |
| 7,284,054 B2 | 10/2007 | Radhakrishnan |
| 7,308,648 B1 | 12/2007 | Buchthal et al. |
| 7,313,789 B1 | 12/2007 | Yellin et al. |
| 7,333,801 B2 * | 2/2008 | Chandhok | 455/412.1 |
| 7,386,786 B2 | 6/2008 | Davis et al. |
| 7,389,330 B2 | 6/2008 | Dillon et al. |
| 7,426,723 B1 | 9/2008 | Nikolov |
| 7,454,526 B2 | 11/2008 | Brown et al. |
| 7,478,401 B2 | 1/2009 | Irassar et al. |
| 7,478,408 B2 | 1/2009 | Sesma |
| 7,487,201 B1 | 2/2009 | Murray et al. |
| 7,496,841 B2 | 2/2009 | Hadfield et al. |
| 7,506,315 B1 | 3/2009 | Kabadiyski et al. |
| 7,509,654 B2 | 3/2009 | Jennings et al. |
| 7,543,267 B2 | 6/2009 | Lindhorst et al. |
| 7,543,271 B2 | 6/2009 | Gadre |
| 7,555,484 B2 | 6/2009 | Kulkarni et al. |
| 7,596,620 B1 | 9/2009 | Colton et al. |
| 7,614,052 B2 | 11/2009 | Wei |
| 7,653,623 B2 | 1/2010 | Kashima et al. |
| 7,685,609 B1 * | 3/2010 | McLellan | 719/328 |
| 7,707,547 B2 | 4/2010 | Colton et al. |
| 7,725,530 B2 | 5/2010 | Sah et al. |
| 7,788,577 B2 * | 8/2010 | Lueck | 715/239 |
| 7,823,009 B1 | 10/2010 | Tormasov et al. |
| 7,844,958 B2 | 11/2010 | Colton et al. |
| 7,921,353 B1 | 4/2011 | Murray |
| 7,958,232 B1 | 6/2011 | Colton et al. |
| 7,958,493 B2 | 6/2011 | Lindsey et al. |
| 2001/0025373 A1 | 9/2001 | Gebhart et al. |
| 2001/0032320 A1 | 10/2001 | Abdelnur et al. |
| 2001/0037292 A1 | 11/2001 | Vogt |
| 2001/0037359 A1 | 11/2001 | Mockett et al. |
| 2002/0007393 A1 | 1/2002 | Hamel |
| 2002/0016828 A1 | 2/2002 | Daugherty et al. |
| 2002/0023158 A1 | 2/2002 | Polizzi et al. |
| 2002/0069255 A1 | 6/2002 | Dinovo |
| 2002/0073235 A1 | 6/2002 | Chen et al. |
| 2002/0099738 A1 | 7/2002 | Grant |
| 2002/0112247 A1 | 8/2002 | Horner et al. |
| 2002/0138555 A1 | 9/2002 | Yu |
| 2002/0184363 A1 | 12/2002 | Viavant et al. |
| 2003/0005044 A1 | 1/2003 | Miller et al. |
| 2003/0061404 A1 | 3/2003 | Atwal et al. |
| 2003/0084431 A1 | 5/2003 | Kobayashi |
| 2003/0088687 A1 | 5/2003 | Begeja et al. |
| 2003/0105810 A1 | 6/2003 | McCrory et al. |
| 2003/0145282 A1 | 7/2003 | Thomas et al. |
| 2003/0177176 A1 | 9/2003 | Hirschfeld et al. |
| 2003/0195923 A1 | 10/2003 | Bloch et al. |
| 2003/0226110 A1 | 12/2003 | Scheering |
| 2004/0003377 A1 | 1/2004 | Di Loreto |
| 2004/0010621 A1 | 1/2004 | Afergan et al. |
| 2004/0021679 A1 | 2/2004 | Chapman et al. |
| 2004/0024813 A1 * | 2/2004 | Pagnano et al. | 709/203 |
| 2004/0061713 A1 | 4/2004 | Jennings |
| 2004/0064822 A1 | 4/2004 | Noda |
| 2004/0066410 A1 | 4/2004 | Lindhorst et al. |
| 2004/0133848 A1 | 7/2004 | Hunt et al. |
| 2004/0143823 A1 | 7/2004 | Wei |
| 2004/0158843 A1 | 8/2004 | Cloccarelli |
| 2004/0167784 A1 | 8/2004 | Travieso et al. |
| 2004/0167876 A1 | 8/2004 | Salerno et al. |
| 2004/0168162 A1 | 8/2004 | Park et al. |
| 2004/0177147 A1 | 9/2004 | Joshi et al. |
| 2004/0177335 A1 | 9/2004 | Beisiegel et al. |
| 2004/0201618 A1 | 10/2004 | Alderson |
| 2004/0205411 A1 | 10/2004 | Hong et al. |
| 2004/0210865 A1 | 10/2004 | Shimura |
| 2004/0225633 A1 | 11/2004 | Jau |
| 2004/0236927 A1 | 11/2004 | Irie et al. |
| 2004/0248558 A1 * | 12/2004 | Chandhok | 455/412.1 |
| 2004/0250262 A1 | 12/2004 | Irassar et al. |
| 2004/0268303 A1 | 12/2004 | Abe et al. |
| 2005/0005160 A1 | 1/2005 | Bates et al. |
| 2005/0015759 A1 | 1/2005 | Zatloukal |
| 2005/0027823 A1 | 2/2005 | Rana |
| 2005/0043940 A1 | 2/2005 | Elder |
| 2005/0044197 A1 | 2/2005 | Lai |
| 2005/0066319 A1 | 3/2005 | DeLine et al. |
| 2005/0069207 A1 | 3/2005 | Zakrzewski et al. |
| 2005/0086344 A1 | 4/2005 | Suesserman |
| 2005/0091576 A1 | 4/2005 | Relyea et al. |
| 2005/0091650 A1 | 4/2005 | Heeb |
| 2005/0102400 A1 | 5/2005 | Nakahara et al. |
| 2005/0144622 A1 | 6/2005 | Ballinger et al. |
| 2005/0160415 A1 | 7/2005 | Kwon et al. |
| 2005/0172338 A1 | 8/2005 | Sandu et al. |
| 2005/0182778 A1 | 8/2005 | Heuer et al. |
| 2005/0188051 A1 | 8/2005 | Sneh |
| 2005/0198202 A1 | 9/2005 | Yamamoto |
| 2005/0246391 A1 | 11/2005 | Gross |
| 2005/0256933 A1 | 11/2005 | Millington et al. |
| 2005/0278641 A1 | 12/2005 | Mansour et al. |
| 2006/0015842 A1 | 1/2006 | DeSantis |
| 2006/0020684 A1 * | 1/2006 | Mukherjee et al. | 709/219 |
| 2006/0047780 A1 | 3/2006 | Patnude |
| 2006/0064434 A1 | 3/2006 | Gilbert et al. |
| 2006/0075088 A1 | 4/2006 | Guo et al. |
| 2006/0080592 A1 | 4/2006 | Alves de Moura et al. |
| 2006/0123397 A1 | 6/2006 | McGuire |
| 2006/0129997 A1 | 6/2006 | Stichnoth et al. |
| 2006/0136555 A1 | 6/2006 | Patrick et al. |
| 2006/0136712 A1 | 6/2006 | Nagendra et al. |
| 2006/0149746 A1 | 7/2006 | Bansod et al. |
| 2006/0150111 A1 | 7/2006 | Farber |
| 2006/0155707 A1 | 7/2006 | Marcjan |
| 2006/0167981 A1 | 7/2006 | Bansod et al. |
| 2006/0173998 A1 | 8/2006 | Ohara |
| 2006/0190997 A1 | 8/2006 | Mahajani et al. |
| 2006/0200503 A1 | 9/2006 | Dosa et al. |
| 2006/0230149 A1 | 10/2006 | Jackson |
| 2006/0253508 A1 | 11/2006 | Colton et al. |
| 2006/0259592 A1 | 11/2006 | Angeline |
| 2006/0277250 A1 | 12/2006 | Cherry et al. |
| 2007/0011650 A1 | 1/2007 | Hage et al. |
| 2007/0055964 A1 | 3/2007 | Mirkazemi et al. |
| 2007/0061700 A1 | 3/2007 | Kothari et al. |
| 2007/0067418 A1 | 3/2007 | Isaacs et al. |
| 2007/0073739 A1 | 3/2007 | Jennings et al. |
| 2007/0100967 A1 | 5/2007 | Smith et al. |
| 2007/0106946 A1 | 5/2007 | Goetz et al. |
| 2007/0107057 A1 | 5/2007 | Chander et al. |
| 2007/0113188 A1 | 5/2007 | Bales et al. |
| 2007/0124500 A1 * | 5/2007 | Bedingfield et al. | 709/245 |
| 2007/0136201 A1 | 6/2007 | Sah et al. |
| 2007/0136477 A1 | 6/2007 | Bryce et al. |
| 2007/0143283 A1 * | 6/2007 | Spencer et al. | 707/5 |
| 2007/0143672 A1 | 6/2007 | Lipton et al. |
| 2007/0150480 A1 | 6/2007 | Hwang et al. |
| 2007/0174419 A1 | 7/2007 | O'Connell et al. |
| 2007/0214239 A1 | 9/2007 | Mechkov et al. |
| 2007/0214261 A1 | 9/2007 | Kikuchi et al. |
| 2007/0231781 A1 | 10/2007 | Zimmermann et al. |
| 2007/0240032 A1 | 10/2007 | Wilson |
| 2007/0250513 A1 | 10/2007 | Hall et al. |
| 2007/0288858 A1 | 12/2007 | Pereira et al. |
| 2008/0010338 A1 | 1/2008 | Curtis et al. |
| 2008/0077556 A1 * | 3/2008 | Muriente | 707/2 |
| 2008/0082965 A1 | 4/2008 | Atkin et al. |
| 2008/0104025 A1 | 5/2008 | Dharamshi et al. |
| 2008/0104224 A1 | 5/2008 | Litofsky et al. |

(56) References Cited

U.S. PATENT DOCUMENTS

| | | |
|---|---|---|
| 2008/0140786 A1 | 6/2008 | Tran |
| 2008/0243475 A1 | 10/2008 | Everhart et al. |
| 2008/0244586 A1 | 10/2008 | Hopp |
| 2008/0288739 A1 | 11/2008 | Bamba et al. |
| 2008/0294794 A1 | 11/2008 | Darugar et al. |
| 2008/0295004 A1 | 11/2008 | Coca et al. |
| 2008/0295164 A1 | 11/2008 | Steiner et al. |
| 2008/0301696 A1 | 12/2008 | Tantawi et al. |
| 2008/0307389 A1 | 12/2008 | Marchant |
| 2009/0013255 A1 | 1/2009 | Yuschik et al. |
| 2009/0030926 A1 | 1/2009 | Aharoni et al. |
| 2009/0100154 A1 | 4/2009 | Stevenson et al. |
| 2009/0106052 A1 | 4/2009 | Moldovan |
| 2009/0106413 A1 | 4/2009 | Salo et al. |
| 2009/0119675 A1 | 5/2009 | Higgins et al. |
| 2009/0172792 A1 | 7/2009 | Backhouse |
| 2009/0210631 A1 | 8/2009 | Bosworth et al. |
| 2009/0216910 A1 | 8/2009 | Duchesneau |
| 2009/0282136 A1 | 11/2009 | Subramanian |
| 2009/0287734 A1 | 11/2009 | Borders |
| 2009/0300210 A1 | 12/2009 | Ferris |
| 2010/0035690 A1 | 2/2010 | Blackburn et al. |
| 2010/0036903 A1 | 2/2010 | Ahmad et al. |
| 2010/0042670 A1 | 2/2010 | Kamalakantha et al. |
| 2010/0064234 A1 | 3/2010 | Schreiber et al. |
| 2010/0070566 A1 | 3/2010 | Vandewalle |
| 2010/0174607 A1 | 7/2010 | Henkin et al. |
| 2010/0223385 A1 | 9/2010 | Gulley et al. |

OTHER PUBLICATIONS

Mitchell, Scott, URL Rewriting in ASP.NET, published Mar. 2004 at http://msdn.microsoft.,com/en-us/library/ms972974.aspx.*

Gudeman, et al., Representing Type Information Dynamically Typed Languages; 1993, acquired from http://citeseerx.ist.psu.edu/viewdoc/download?doi=10.1.1.39.4394&rep=rep1&type=pdf, pp. 1.38.

Jsmin, The JavaScript Minifier, Douglas Crockford, www.crockford.com, Dec. 4, 2003, downloaded Sep. 13, 2011 from http://www.crockford.com/javascript/jsmin.html.

Lars Aronsson, Operation of a Large Scale, General Purpose Wiki Website, VWF Berlin, 2002, pp. 27-37.

Making JavaScript Smaller: Dojo's Compressor, downloaded from the Internet WaybackMachine http://web.archive.org/web/20061114133532/http://dojotoolkit.org/docs/compressor_system.html on Sep. 13, 2011, archived on Nov. 11, 2006.

Morfik announces Ajax IDE, Wednesday Sep. 28, 2005, ajaxian.com, pp. 1-3.

Niels Leenheer, rakaz, "Make your pages load faster by combining and compressing javascript and css files," Dec. 18, 2006, rakaz.nl/2006/12/make-your-pages-load-faster-by-combining-and-compressing-javascript-and-css-files.html, pp. 1-4.

Portions of the file history of U.S. Appl. No. 11/735,428.
Portions of the file history of U.S. Appl. No. 12/270,817.
Portions of the file history of U.S. Appl. No. 12/270,868.
Portions of the file history of U.S. Appl. No. 12/273,539.
Portions of the file history of U.S. Appl. No. 12/275,182.
Portions of the file history of U.S. Appl. No. 12/275,213.
Portions of the file history of U.S. Appl. No. 12/276,327.
Portions of the file history of U.S. Appl. No. 12/276,336.
Portions of the file history of U.S. Appl. No. 12/276,337.
Portions of the file history of U.S. Appl. No. 12/325,239.
Portions of the file history of U.S. Appl. No. 12/325,240.
Portions of the file history of U.S. Appl. No. 12/325,268.
Portions of the file history of U.S. Appl. No. 12/326,035.
Portions of the file history of U.S. Appl. No. 12/326,087.
Portions of the file history of U.S. Appl. No. 12/326,103.
Portions of the file history of U.S. Appl. No. 12/326,110.
Portions of the file history of U.S. Appl. No. 12/326,111.
Portions of the file history of U.S. Appl. No. 12/326,833.
Portions of the file history of U.S. Appl. No. 12/326,861.
Portions of the file history of U.S. Appl. No. 12/326,891.
Portions of the file history of U.S. Appl. No. 12/326,910.
Portions of the file history of U.S. Appl. No. 12/327,330.
Portions of the file history of U.S. Appl. No. 12/327,802.
Portions of the file history of U.S. Appl. No. 12/334,434.
Portions of the file history of U.S. Appl. No. 12/477,842.
Portions of the file history of U.S. Appl. No. 12/478,740.
Portions of the file history of U.S. Appl. No. 12/478,743.
Portions of the file history of U.S. Appl. No. 12/478,746.
Portions of the file history of U.S. Appl. No. 12/563,159.
Portions of the file history of U.S. Appl. No. 12/766,908.
Portions of the file history of U.S. Appl. No. 12/955,881.
Portions of the file history of U.S. Appl. No. 13/154,090.
Portions of the file history of U.S. Appl. No. 13/175,570.

Server Side JavaScript Guide, Nov. 12, 1998, Netscape Communications Corp., pp. 1-4.

Shao, et al., A type-based compiler for standard ML;ACM, 1995, pp. 116-129.

Steve Vinoski, "Scripting JAX-WS," IEEE Internet Computing, May & Jun. 2006, pp. 91-94.

Susanne Hupfer, Li-Te Cheng, Steven Ross, John Patterson, Introducing Collaboration into an Application Development Environment, Nov. 6-10, 2004, ACM, vol. 6, Issue 3; pp. 21-24.

Written Opinion of the International Searching Authority for PCT/US07/01697.

Written Opinion of the International Searching Authority for PCT/US07/66673.

* cited by examiner

Tasks To Do

Any Changes should be automatically saved to your database.

New    | Take out the trash |    | Add |

☐ | Book tickets |

☐ | Buy Milk |

☐ | This is another task |

☐ | This is a task |

ON-THE-FLY REWRITING OF UNIFORM RESOURCE LOCATORS IN A WEB-PAGE

CROSS REFERENCE TO RELATED APPLICATION

This Application claims priority to U.S. Provisional Patent Application No. 60/991,769, filed on Dec. 3, 2007, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention is related to development of Web-sites and Web-applications. More specifically, the present invention relates to rewriting of uniform resource locators on an HTML document.

2. Description of the Related Art

Web applications are typically rich in hyperlinks. This richness in hyperlinks sometimes results in poor performance of a Web-site such as loading of a Web-page on a user's browser. Typically, the hyperlinks, uniform resource locators, are lengthy and the servers pertaining to the hyperlinks may be overloaded.

Prior to Rich Internet Applications, traditional Web applications involved a client-server architecture with all of the processing on the server side and the client-side used to display the HTML web-pages served by the server. Each time a user desired to view a new Web-page, a HTTP request was sent to the server and the requested Web-page was served to the Web browser on the client-side. Such a traditional system is shown in FIG. 1 with a Web-server 1000 on a server side receiving requests over the Internet 1005 from a Web-browser 1003 on a client-side.

Rich Internet Applications, such as Ajax, greatly improved on the traditional client-server architecture by allowing the client machine to dynamically render and partially refresh web pages based on an initial set of instructions from the server, user input, and small amounts of subsequent data dynamically requested from the server. As shown in FIG. 2, the client machine processes Ajax instructions to render a Web page for the user.

Early Web applications allowed a user's browser to send a request to a server. The server processed the request and responded to the browser with a Web page. When the user wanted to view a new page, another request was sent to the server and the server responded to the browser with a new Web page. Such a process resulted in a waste of bandwidth since much of the Web contents in the first Web page were also contained in the second web page. The need to resend the same information led to a much slower user interface of a Web application than that of a native application.

An emerging technology, called Ajax (Asynchronous and JavaScript XML), was developed for refreshing part of a page instead of refreshing the whole page on every interaction between the user and application. In an Ajax application, when a user submits a form in a page, a script program, usually a JavaScript program, resident on the Web browser receives the user's request and sends a XML (Extended Markup Language) HTTP (Hyper Text Transfer Protocol) request to the Web server in background so as to retrieve only the needed Web contents instead of the whole page and perform corresponding processing to partly refresh the page when receiving a response from the Web server. In this way, the application response time is shortened, because the amount of data exchanged between the Web browser and the Web server is greatly reduced. And the processing time of the Web server is saved because much of the processing is performed at the client side.

General definitions for terms utilized in the pertinent art are set forth below.

Ajax is the use of dynamic HTML, JavaScript and CSS to create dynamic and usually interactive Web sites and applications. A more detailed explanation of Ajax is set forth in Edmond Woychowsky, *AJAX, Creating Web Pages with Asynchronous JavaScript and XML*, Prentice Hall, 2007, which is hereby incorporated by reference in its entirety.

Applets or Java Applets are mini-executable programs named with the .class suffix and are placed on a Web page and provide interactive and multimedia uses.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

An Attribute provides additional information about an element, object or file. In a Document Object Model, an attribute, or attribute node, is contained within an element node.

Behavioral layer is the top layer and is the scripting and programming that adds interactivity and dynamic effects to a site.

Binding in a general sense is the linking of a library to an application program usually to prevent repetition of frequently utilized code.

Cascading Style Sheets (CSS) is a W3C standard for defining the presentation of Web documents.

Compiler is a computer program that translates a series of instructions written in one computer language into a resulting output in a different computer language.

Document Object Model (DOM) Element is an object contained in a Document Object Model (DOM). The term DOM is generally used to refer to the particular DOM held in the memory region being used by the Web browser. Such a DOM controls the Graphical Respondent Interface (GRI) or Graphical User Interface (GUI). The DOM is generated according to the information that the Web browser reads from the HTML file, and/or from direct JavaScript software instructions. Generally, there exists a unique DOM element for every unique HTML element. DOM elements are sometimes referred to as HTML/DOM elements, because the DOM element exists only because HTML code that was read by the Web browser listed some HTML element that had not previously existed, and thereby caused the Web browser to create that DOM element. Often specific elements of the greater set of HTML/DOM elements are identified by specifying an HTML/DOM checkbox element, or an HTML/DOM text input element. A more detailed explanation of the document object model is set forth in Jeremy Keith, *DOM Scripting, Web Design with JavaScript and the Document Object Model*, friends of, 2005, which is hereby incorporated by reference in its entirety.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer. JavaScript is discussed in greater detail below.

JSON is JavaScript Object Notation format, which is a way of taking data and turning it into valid JavaScript syntax for reconstituting an object at the other end of the transmission protocol.

MySQL is a relational database management system which relies on SQL for processing data in a database.

Parser is a component of a compiler that analyzes a sequence of tokens to determine its grammatical structure with respect to a given formal grammer. Parsing transforms input text into a data structure, usually a tree, which is suitable for later processing and which captures the implied hierarchy of the input. XML Parsers ensure that an XML document follows the rules of XML markup syntax correctly.

PHP is a scripting language that allows developers create dynamically generated Web pages, and is used for server-side programming.

Platform is the combination of a computer's architecture, operating system, programming language (PHP, JAVA, RUBY ON RAILS), runtime libraries and GUIs.

Presentation layer follows the structural layer, and provides instructions on how the document should look on the screen, sound when read aloud or be formatted when it is printed.

Rendering engine is software used with a Web browser that takes Web content (HTML, XML, image files) and formatting information (CSS, XSL) and displays the formatted content on a screen.

Serialization places an object in a binary form for transmission across a network such as the Internet and deserialization involves extracting a data structure from a series of bytes.

SQL (Structured Query Language) is a computer language designed for data retrieval and data management in a database.

Structural layer of a Web page is the marked up document and foundation on which other layers may be applied.

User is a client computer, generally operated by a human being, but in some system contexts running an automated process not under full-time human control.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

World Wide Web Consortium (W3C) is an unofficial standards body which creates and oversees the development of web technologies and the application of those technologies.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

There are three types of JavaScript: 1) Client-side JavaScript; 2) Server-side JavaScript; and 3) Core JavaScript. Client-side JavaScript is generally an extended version of JavaScript that enables the enhancement and manipulation of web pages and client browsers. Server-side JavaScript is an extended version of JavaScript that enables back-end access to databases, file systems, and servers. Core JavaScript is the base JavaScript.

Core JavaScript includes the following objects: array, date, math, number and string. Client-side JavaScript and Server-side JavaScript have additional objects and functions that are specific to client-side or server-side functionality. Generally, any JavaScript libraries (.js files) created in core JavaScript can be used on both the client and the server without changes. Client-side JavaScript is composed of a Core JavaScript and additional objects such as: document, form, frame and window. The objects in Client-side JavaScript enable manipulation of HTML documents (checking form fields, submitting forms, creating dynamic pages) and the browser (directing the browser to load other HTML pages, display messages). Server-side JavaScript is composed of Core JavaScript and additional objects and functions for accessing databases and file systems, and sending email. Server-side JavaScript enables Web developers to efficiently create database-driven web applications. Server-side JavaScript is generally used to create and customize server-based applications by scripting the interaction between objects. Client-side JavaScript may be served by any server but only displayed by JavaScript-enabled browsers. Server-side JavaScript must be served by a JavaScript-enabled server but can be displayed by any browser.

Dinovo, United States Patent Publication Number 20020069255 for a Dynamic Content Delivery To Static Page In Non-Application Capable Environment discloses a system for incorporating dynamic content into a static page from a non-application capable server.

Mocket et al., United States Patent Publication Number 20010037359 for a System And Method For A Server-side Browser Including Markup Language Graphical User Interface, Dynamic Markup Language Rewriter Engine And Profile Engine describes a system and method for a server-side browser including markup language graphical user interface, dynamic markup language rewriter engine and profile engine. The system includes a user computer and a destination server computer separated by a server computer hosting a server-side browser (SSB). The SSB includes a markup language graphical user interface (MLGUI), a dynamic markup language rewriter engine (DMLRE) and a profiling engine (PE). The SSB may be configured as an intermediary infrastructure residing on the Internet providing customized information gathering for a user. The components of the SSB allow for controlling, brokering and distributing information more perfectly by controlling both browser functionality (on the client-side) and server functionality (on the destination site side)

within a single point and without the necessity of incremental consents or integration of either side.

Irassar et al., United States Patent Publication Number 20040250262, for *Business To Business Event Communications* discloses an event handling mechanism that allows communication of event information among providers and subscribers across a network using an event handling server.

Jennings et al., United States Patent Publication Number 20070073739 for a Data-Driven And Plug-In Defined Event Engine, discloses an event engine that enables application developers to define finite state machines for implementation via a data-driven approach using executable plug-ins.

Lindhorst et al., U.S. Pat. No. 6,981,215 for a System For Converting Event-Driven Code Into Serially Executed Code, discloses an event-driven server model that uses active server pages that appear to other files as objects with associated method and properties for developing Web pages.

Wilson, United States Patent Publication Number 20070240032, for a Method And System For Vertical Acquisition Of Data From HTML Tables discloses passing a HTML document's content from a table to a DOM interpreter and parsing selected data to a formatted data structure on a browser.

Monsour et al., United States Patent Publication Number 20050278641 for a JavaScript Calendar Application Delivered To A Web Browser, discloses a JavaScript application that generates HTML on-the-fly from within invisible frames and renders such HTML on a user's screen in visible frames.

Alderson, United States Patent Publication Number 20040201618 for Streaming Of Real-Time Data To A Browser discloses means for sending real-time data to a browser in batches at a predetermined time by storing data in a queue either on the browser or server.

Dillon et al., U.S. Pat. No. 7,389,330 for a System And Method For Pre-Fetching Content In A Proxy Architecture discloses a system that uses an upstream proxy server in communication over a WAN with a downstream proxy server that communicates with a browser, which allows for pre-fetching of objects by the upstream proxy server over the Internet from a Web-server.

McCollum et al., U.S. Pat. No. 7,269,636 for a Method And Code Module For Adding Function To A Web Page discloses a means for adding function to a Web page on Web browser.

However, current technologies that operate Server-side JavaScript fail to offer complete interactions which are the hallmark of rich Web sites and applications. Web content is, of course, rich in hyperlinks and pseudo-hyperlinks (e.g., JavaScript event handlers that cause link-like behavior). However, these hyperlinks are not optimized in a web-page.

BRIEF SUMMARY OF THE INVENTION

The Present Invention overcomes the obstacles of the prior art. Because the present invention understands the content natively, the present invention uses that understanding to optimize the links and their associated behaviors. For example, the present invention understands the links in a web-page and across multiple web-pages and substitutes shorter links. The present invention changes links to shift the load to different servers or to handle new security concerns. The present invention reroutes a sample of the links or links on a sample of web-page requests. The present invention does all of the above at runtime based on variable data and without changing the original files or applications used to generate the web-pages.

One aspect of the present invention is a method for on-the-fly rewriting of a plurality of URLs in a web-page. The method includes transmitting a request for a web-page from a client-side. The method also includes retrieving the web-page at a server side, the web-page comprising a plurality of hyperlinks. The method also includes analyzing the plurality of hyperlinks of the web-page at the server-side. The method also includes optimizing the plurality of hyperlinks of the web-page without affecting an original code of the web-page to generate an optimized web-page. The method also includes transmitting the optimized web-page to the client-side.

Preferably, the plurality of hyperlinks comprises a plurality of pseudo-hyperlinks.

Preferably, the step of optimizing the plurality of hyperlinks of the web-page comprises substituting shorter links for each of the plurality of hyperlinks. Alternatively, the step of optimizing the plurality of hyperlinks of the web-page comprises changing each of the plurality of hyperlinks to shift the load to at least one different server. Alternatively, the step of optimizing the plurality of hyperlinks of the web-page comprises rerouting at least one of the plurality of hyperlinks.

Yet another aspect of the present invention is a computer program product for on-the-fly rewriting of a plurality of URLs in a web-page. The computer program product includes means for retrieving a web-page, means for analyzing the plurality of hyperlinks of the web-page, means for optimizing the plurality of hyperlinks of the web-page without affecting an original code of the web-page to generate an optimized web-page, and means for transmitting the optimized web-page to the web-browser over a network.

Yet another aspect of the present invention is a system for on-the-fly rewriting of a plurality of URLs in a web-page. The system includes a web-page comprising a plurality of hyperlinks, a network, a web-browser having means for transmitting a request for the web-page over the network, and a web-server-side. The web-server-side includes means for retrieving a web-page, means for analyzing the plurality of hyperlinks of the web-page, means for optimizing the plurality of hyperlinks of the web-page without affecting an original code of the The present invention parses and executes the Web-page as a browser would parse the web-page. The present invention is configured to execute all or part of the code on that page, load external resources or not, and call various external systems in the course of processing the Web-page. As a result, the present invention can faithfully analyze the load-producing traffic in real time, e.g. monitoring how many links to certain resources are really being sent, whether they are clustered in certain ways (e.g. per page, per application or site, per user, per session), how much overlap they contain, and where do they appear and how their content is being used. In addition to reporting all this data and presenting the data in various ways to the system operators, the present invention effects certain optimizations. For example, the present invention aggregates multiple JavaScript and CSS files into single files, caches them, and replaces the multiple links to the original files into single links to the new files, thus reducing the number of network trips needed to complete the Web-page. The present invention delivers only the pieces of code that are used often, and proxies the rest of the code to deliver them on demand. The present invention reassembles JavaScript files for more optimal caching on the client and fewer network trips, and present invention can do so for images too using a technique known as image sprites. Further the present invention does all of this without changing the original code and files used to generate the web-pages. The on-the-fly (runtime) information and optimizations are then used as actionable feedback to change the original code and files or for building new code and files better.

To understand the differences between the server and browser sides, it's important to keep in mind the page lifecycle. The page request from the browser is received by the Web server, which fetches the appropriate HTML document (either from the file system or perhaps from another "handler" such as PHP or Ruby or Java). The Web server (Apache server) then feeds the document to the script server of the present invention, which begins to parse the HTML document and builds up the DOM tree. When the script server encounters <script> tags the script server not only adds them to the DOM but may also execute them if they have a runat attribute that indicates they should run on the server. During the parsing and execution, external content may also be fetched and loaded into the document, via <script src=" . . . "></script> elements and Jaxer.load ( . . . ) for JavaScript code, or via <jaxer:include src=" . . . "></jaxer:include> (or <jaxer:include path=" . . . "></jaxer:include>) for HTML content, or via XMLHttpRequests for any content. After the DOM is fully loaded, the onserverload event is fired. This is the server-side equivalent of the onload event on the browser. The onserverload event is named differently so that a developer's code can react separately to onserverload and onload events. The script server post-processes the DOM to carry out its built-in logic and prepare the DOM for sending to the browser: removing <script> blocks meant only for the server, replacing functions to be proxied with proxies, saving (as needed) functions that should be available on callbacks, . . . etc. Finally, the DOM is serialized back to HTML, and that HTML is streamed back via the Web server to the browser.

The resulting HTML page is sent back to the browser as the response to the browser's request. The browser begins to parse the HTML, building up the DOM. When the browser encounters <script> tags the browser not only adds them to the DOM but also executes them. External JavaScript code or any other content may also be loaded. The onload event fires. Of course the page is progressively rendered throughout much of this flow, and also the user can interact with it.

Callbacks from the browser to server-side functions are handled via XMLHttpRequests. When the script server receives such a request, it creates a new, empty document (unless configured to use a different static document). The script server retrieves the saved functions that are needed to be made available during callbacks to this page. If a function called oncallback is found, it is executed. This is usually used to create the environment needed during a callback, if the saved functions are not enough. The callback function itself is executed. Finally, the result of that execution is packaged and returned as the response to the XMLHttpRequest.

While a DOM is available during callback processing, it is not serialized as HTML and returned as the response, as it was during the "regular" (non-callback) page processing flow. The DOM on script server and the DOM on the browser typically are not synchronized. Both are created from the same HTML source, but they are often subject to processing by different JavaScript code, and both come to life at different points in the page lifecycle: the DOM on the script server exists temporarily when the page is processed by the script server, and is eliminated after it's been serialized into the HTML sent to the browser; the DOM in the browser is built, on the browser, from that HTML, and is the DOM that's rendered to the user and with which the end-user interacts.

While script server and the browser may well share some code (e.g. when using runat="both"), usually the JavaScript code designated to run on script server and interacting with the script server DOM is different than the code designated to run on the client. The latter exists e.g. as a <script> tag in the script server DOM but is not executed in script server.

Remember that the only things sent to the browser at the end of page processing is what's actually in the DOM, and what the script server of the present invention has added such as proxies, clientData, and injected scripts. For example, if a developer added an expando property, which is an in-memory change to the DOM that will not get serialized, it will not appear on the client side.

var div=document.createElement ("div");
div.id="myDiv";
document.body.appendChild(div);
document.getElementById("myDiv").userId=123;

On the browser the div is present, with an id of "myDiv", but without a "userId" property. For this same reason, setting event handlers programmatically rather than in the DOM will not translate to DOM changes and hence will not propagate to the browser. For example with a button: <input type="button" id="myButton" value="Click me">

A developer could add an onclick=" . . . " attribute to the tag, but this does not assist with adding the event handler programmatically. The script server of the present invention provides Jaxer.setEvent (domElement, eventName, handler) function that "does the right thing" in the script server as well as on the browser. var btn=document.getElementById("myButton"); function sayHi( ) {alert ("hi")} sayHi.runat="client"; Jaxer.setEvent(btn, "onclick", sayHi);

The function used as the event handler should be made available to the browser. When setEvent is executed on the server, as above, it results in the following change to the myButton element: <input type="button" id="myButton" value="Click me" onclick="sayHi( )"> This is sent to the browser since it is a DOM change. If the function passed into setEvent has no name, its body (source) is used as the value of the attribute: var btn =document.getElementById("myButton"); Jaxer.setEvent (btn, "onclick", function( ) {alert("hi");});

This results in the following: <input type="button" id="myButton" value="Click me" onclick="(function( ) {alert(\"hi\");}) ( )">

Which is useful for short functions but is easier to pass in the code to execute as a string: var btn=document.getElementById("myButton");Jaxer.setEvent(btn, "onclick", "alert('hi')");

Which results in:<input type="button" id="myButton" value="Click me" onclick="alert('hi')">

The environment of the present invention is preferably based upon the very same Mozilla engine which powers Firefox 3. This means that, for the most part, DOM interaction in the server using the present invention is the same as interacting with the DOM in a Web browser. It parses and executes pages progressively, building up the DOM as it goes along, and allowing JavaScript to interact with whatever DOM has already been built up at the time the JavaScript executes. Any document.write( ) calls will write to the DOM immediately following the current location on the page. The JavaScript that is part of a page, and loaded into the page, executes within the context of the global window object. For each request at the server, the present invention preferably provides a document object model. This DOM (which we'll refer to as DOM1) can be used to insert data and otherwise transform the page before it is first returned to the browser. You interact with and manipulate the DOM much the same as you would in the browser. Some third party Javascript toolkits, such as iQuery, can also be used to modify this DOM. The document is accessible through the document object, and the root element of the DOM is accessible through the document.documentElement object. To ensure that element properties are serialized properly when the DOM is returned to the browser, use element.setAttribute("attr", "value") rather than element.foo="value". Form element values set with formElement.value [code font] are an exception; they'll still be serialized as expected. To attach an event handler to an element, preferably use the special Jaxer method Jaxer.setEvent( ). Example: Transforming the DOM.

```
<script type="text/javascript" runat="server">
  window.onserverload=function( ) {
    var textNode=document.createTextNode("wocka wocka
      wocka");
    var element=document.getElementById("container");
    element.appendChild(textNode);
  };
</script>
```

A developer can manipulate the DOM in the API's, for example by using the following:

```
<script runat="server">
  Document.getElementById('useBillingAddr-
  Chkbox').checked=
    Jaxer.session.get('userSessionBillingAddrValue');
</script>
```

The present invention allows Web-developers to consume and transform content from HTML pages written in other languages like PHP, PYTHON, RUBY ON RAILS, .NET or JAVA. The present invention includes a rich framework for many useful tasks on the server, including accessing local or remote Web resources and services without cross-domain security restrictions that a browser might impose, or rewriting HTML pages generated by other platforms such as set forth below.

```
<script runat="server">
var data=Jaxer.Serialization.from JSONString(
  Jaxer.Web.get("pricingService.php?productId=7234"));
</script>
```

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 6 is a Web-page generated by the code.

DETAILED DESCRIPTION OF THE INVENTION

Figure 1:
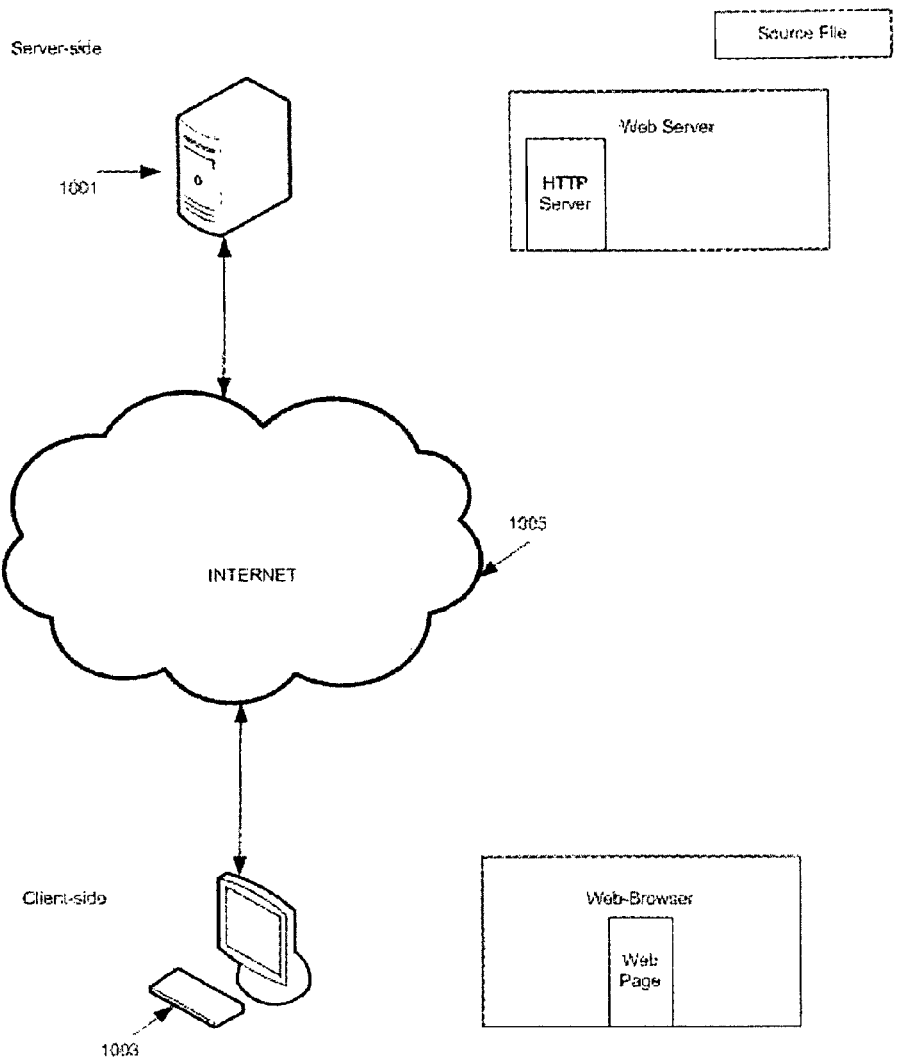
FIG. 1 is a block diagram of a web system of the prior art.
Figure 2:
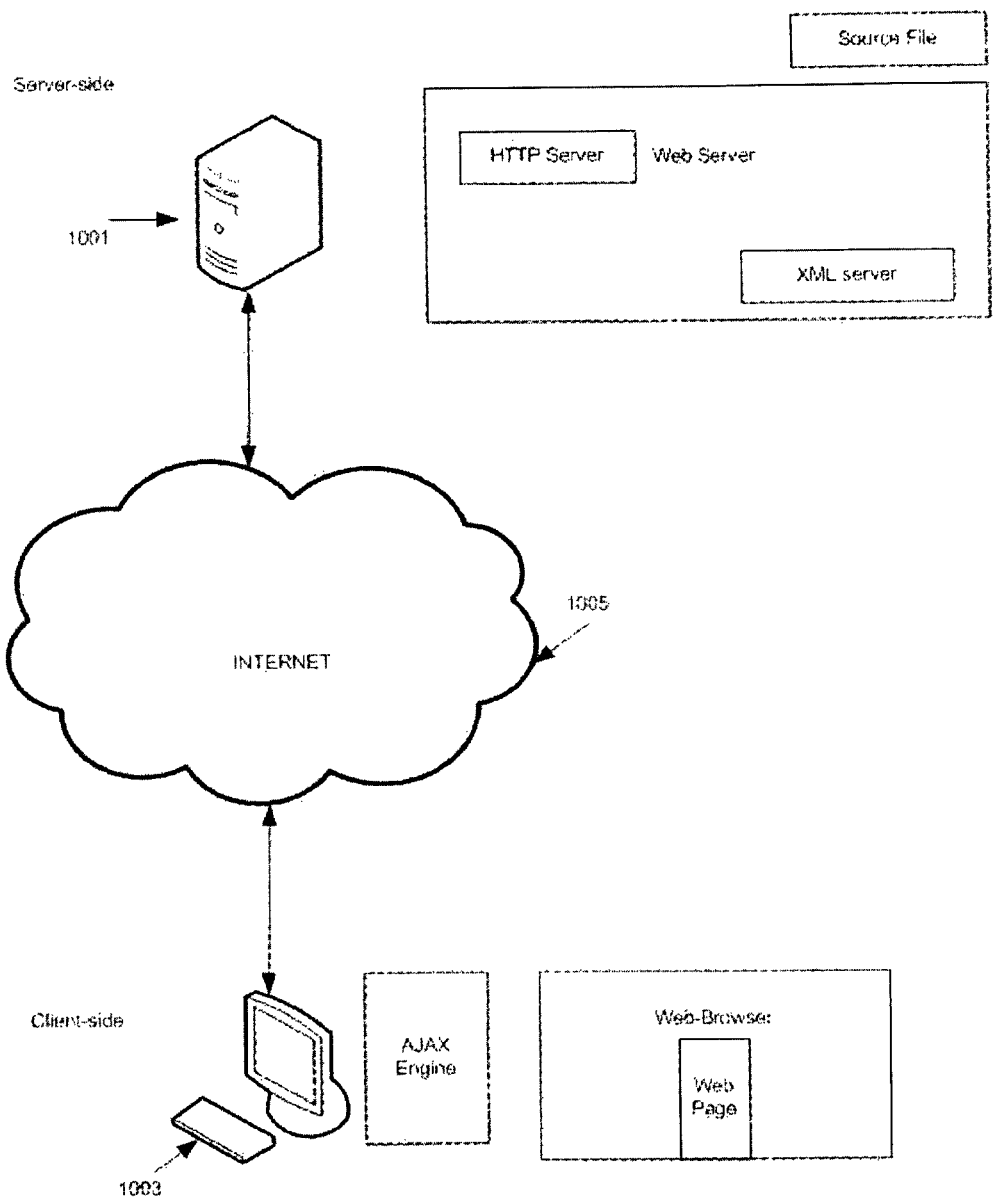
FIG. 2 is a block diagram of a web system of the prior art.
Figure 3:
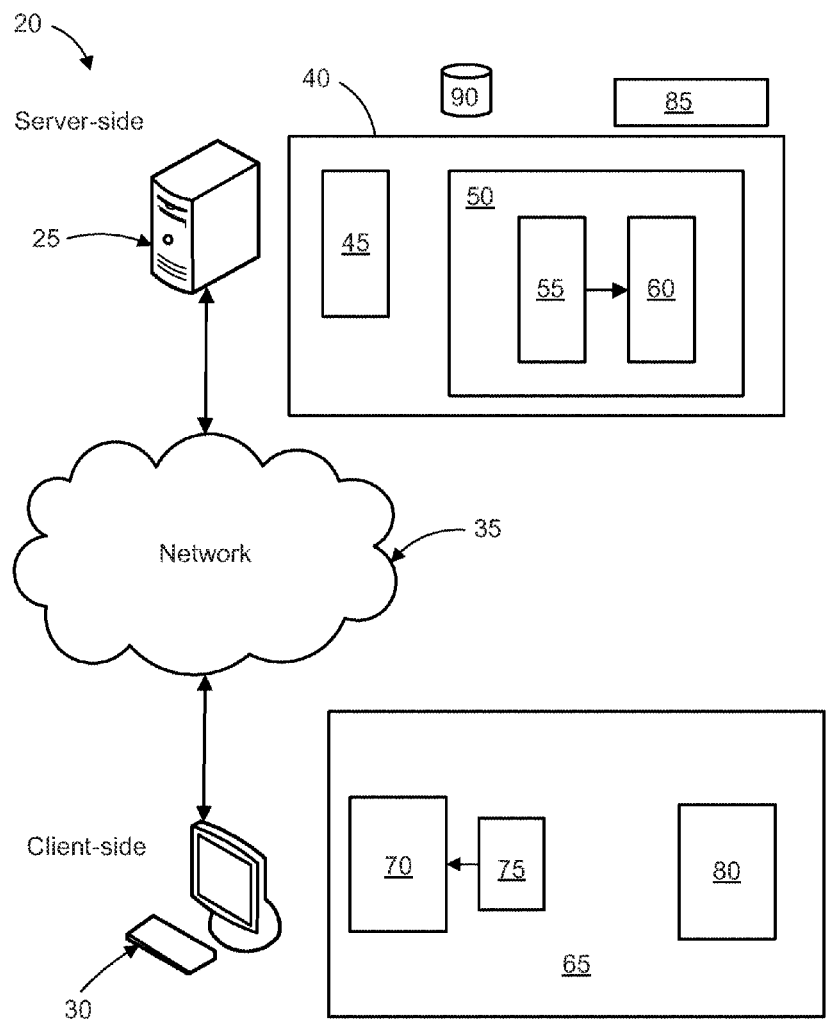
FIG. 3 is a block diagram of the system of the present invention during a callback.

As shown in FIG. 3 a system 20 of the invention generally includes a server-side 25, a client side 30 and a network or preferably the Internet 35. The server-side 25 includes a web-server 40, a handler 45 and a JavaScript server 50 preferably having a server-core 55 and a server-framework 60. The client-side 30 includes a Web-browser 65 has a client-framework 70, a client-side JavaScript code 75 and a rendering engine 80. The server-framework 60 accesses filesystems 85 and databases 90, as well as the Internet 35. A more detailed description of the abilities of the running JavaScript on the server-side and client-side is disclosed in Colton et al., U.S. patent application Ser. No. 12/270,817, filed Nov. 13, 2008 for A Web Server Based On The Same Paradigms As Web-Clients, which is hereby incorporated by reference in its entirety. An additional detail of facilitated server-side to client-side communications is disclosed in Colton et al., U.S. patent application Ser. No. 12/276,327, filed Nov. 22, 2008 for a System And Method For Facilitated Client-Side To Server-Side Communications, which is hereby incorporated by reference in its entirety.

In FIG. 3, the system 20 is shown during a callback operation. The callback begins at the client-side JavaScript code 75 with a callback request sent to the client-framework 70. A HTTP GET/request is transmitted over the Internet 35 to the server-side 25, and received at the Web-server 40. The HTTP GET/request is sent to the server-core 55 which sends the HTTP GET/request as a callback to the server-framework 60. The server-framework 60 receives the callback, deserializes, performs the get functions, invokes, serializes and sends the response to the callback to the server-core 55. The server-core 55 sends the response to the Web-server 40 which sends the response over the Internet 35 to client-framework 70 on the Web-browser 65.

Figure 4:
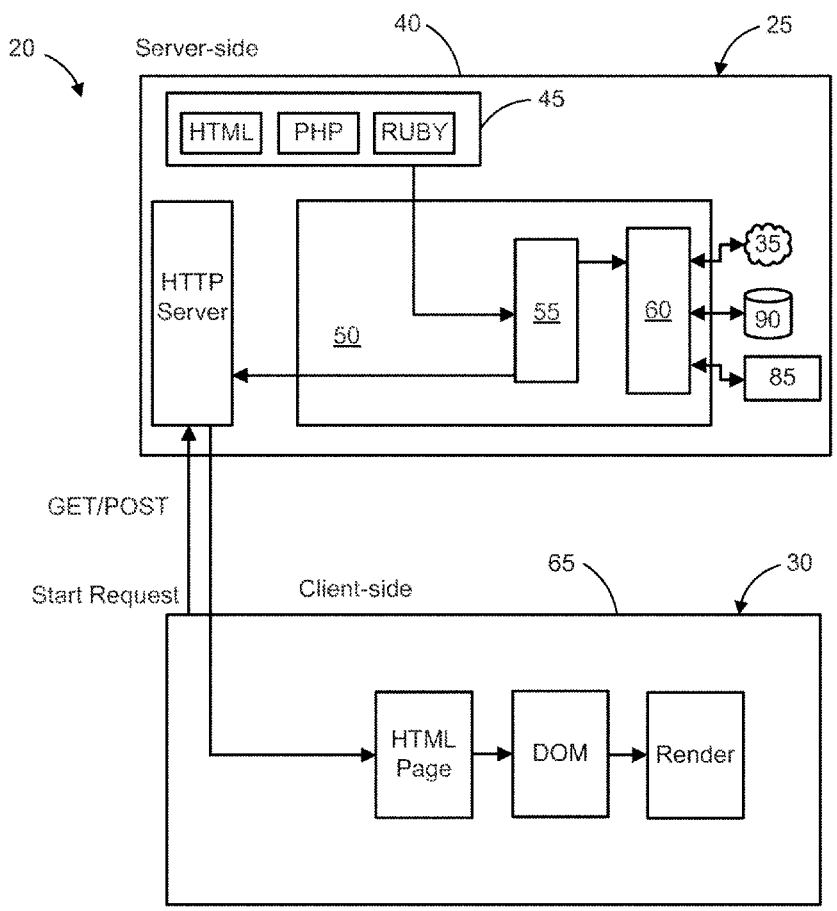
FIG. 4 is a block diagram of the system of the present invention during a normal process.
Figure 4A:
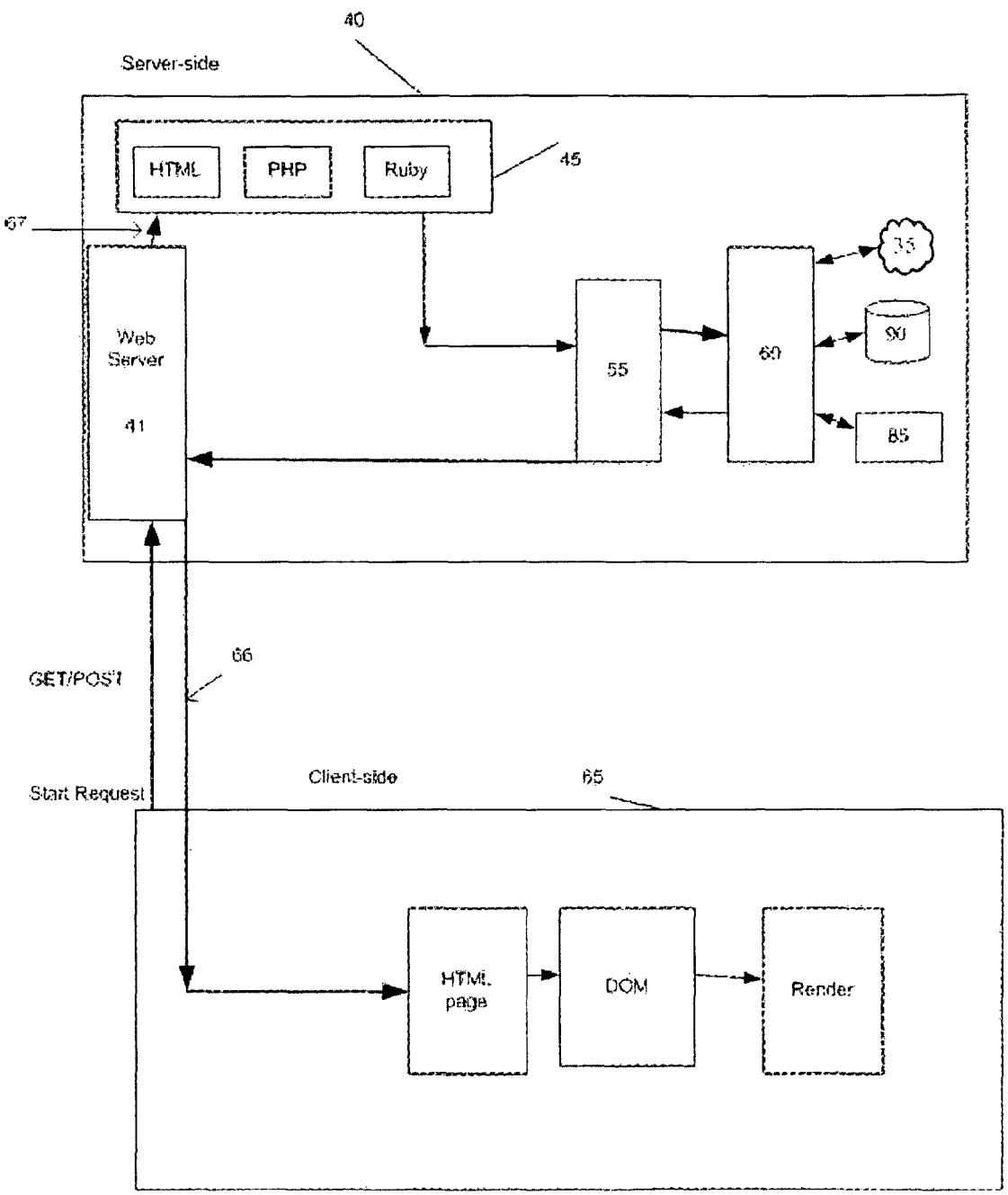
FIG. 4A is a block diagram of the system of the present invention during a normal process.

In FIG. 4, the system 20 is shown during a normal process. The process begins with a HTTP GET/request for a Web-page sent over the Internet 35 from the Web-browser 65 on the client-side 30 to the server-side 25. The HTTP Request is sent to the handler server 45. The HTML Web-page is then sent to the script server architecture 50. The server-core 55 of the script server architecture 50 parses the HTML Web-page to create a HTML DOM of the HTML Web-page. The server-core 55 also parses and interprets the JavaScript of the HTML Web-page. The server-framework 60 accesses databases 90 and filesystems 85 to respond to the Requests for the HTML Web-page. The server-framework 60 also injects proxies to modify the HTML Web-page. The server-core 55 serializes the DOM back to the HTML Web-page and the web-server 40 transmits the HTML Web-page to the client-side 30 where the Web-browser 65 renders the HTML Web-page for display for a user. As shown in FIG. 4A, a Web server (e.g., apache server) 41 receives a request from the client-side. The request 67 is sent to the handler server (PHP, Ruby or Java language) 45. The handler server 45 feeds the HTML document to script server-core 55 which begins to parse the HTML document thereby building the DOM tree for the HTML document on the server-side. Events and callbacks are sent to the script server-framework 60. The script server adds <script> tags to the DOM and executes them if the <script> has a runat attribute that indicates the <script> should be run on the server. During the parsing and execution, external content from filesystems 85, databases 90, and the like are fetched and loaded into the HTML document. After the DOM is loaded, the onserverload event is fired from the script server framework 60. The script server architecture post-processes the DOM to perform its built in logic and prepare the DOM for transmission to the client side. This post-process includes removing <script> block meant only for the server, replacing function to be proxied with proxies, saving functions that should be available as callbacks, and the like. The DOM is serialized back to HTML, and the HTML is streamed back via the web server 41 to the browser. A more detailed explanation of event-driven JavaScript architecture is set forth in Colton et al., U.S. patent application Ser. No. 12/273,539, filed on Nov. 18, 2008, for a Flexible, Event-Driven JavaScript Server Architecture, which is hereby incorporated by reference in its entirety. A more detailed explanation of on-the-fly processing is set forth in Colton et al., U.S. patent application Ser. No. 12/276,337, filed on Nov. 22, 2008, for a System And Method For On-The-Fly, Post-Processing Document Object Model Manipulation, which is hereby incorporated by reference in its entirety.

Figure 10:
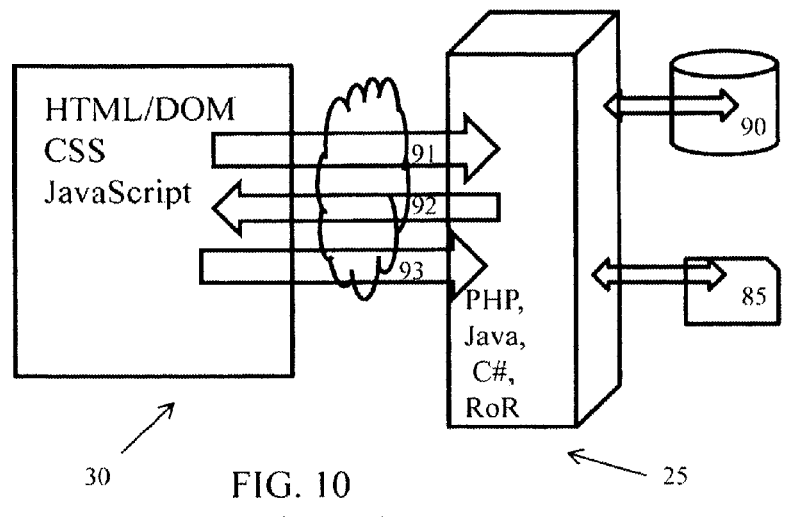
FIG. 10 is a block diagram of a prior art application stack illustrating the interactions between the client side and the server-side.
Figure 11:
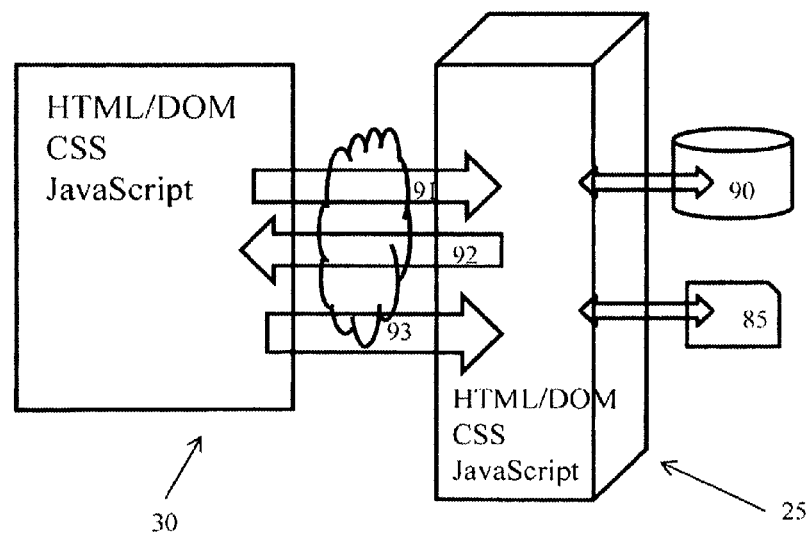
FIG. 11 is a block diagram of an application stack of the present invention illustrating the interactions between the client side and the server-side.

FIGS. 10 and 11 illustrate the difference in the application stacks between the prior art and the present invention. In both FIGS. 10 and 11, a client-side is designated 30 includes the HTML/DOM, CSS and JavaScript. In both FIGS. 10 and 11, arrow 91 is a request, arrow 92 is a response and arrow (both directions) 93 is a callback. The server-side 25 is the difference. The server-side 25 of the prior art is PHP, Java, RoR and C#. The server-side of the present invention is HTML/DOM, CSS and JavaScript. In the prior art, FIG. 10, Callbacks 93 require that the client-side 30 wrap, send, receive and unwrap the callback while the server-side 25 is required to receive, unwrap, run, wrap and send the callback. In the present invention, callbacks 93 are handled via XMLHttpRequests. When the server-side receives the request, the script-server architecture preferably creates a new, empty HTML document. The script-server architecture retrieves to this HTML document the saved functions needed to be made available during the callback. If a function designated oncallback is located, it is executed in order to create an environment needed during a callback, especially if the saved functions are not sufficient. Then, the callback function is executed and the results of the execution are packaged and returned as the response to the XMLHttpRequest.

Figure 5:
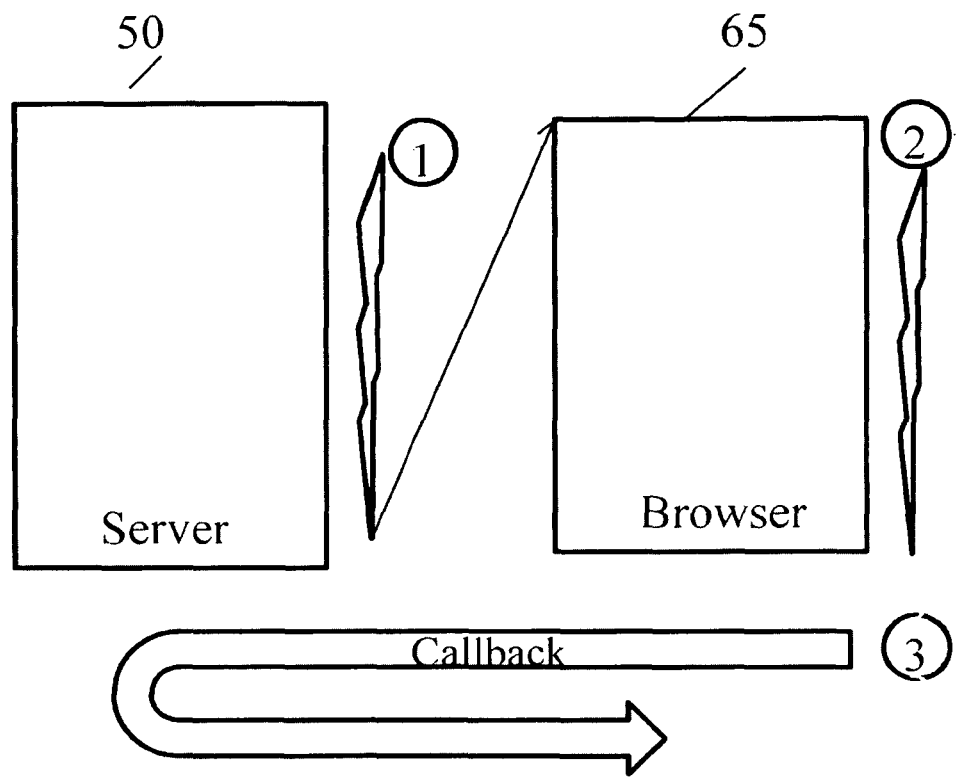
FIG. 5 is a block diagram of a callback process.

As shown in FIG. 5, the present invention allows the server 50 to execute the JavaScript functions that are set to runat="server" or runat="both." These functions might call databases, file systems, communicate across network sockets, or get session data. And since the server-side engine has a HTML DOM just like the browser, the HTML page can be manipulated through standard DOM APIs and your favorite Ajax libraries. The present invention also has session objects that can be used to persist data for users during a session or transaction. Any functions set to runat="server" are stripped from what gets sent to the browser 65. Specifically at 1, the page executes on the server 50 and a resulting HTML page is sent to the browser 65. A more detailed description of the runat function is set forth in Colton et al., U.S. patent application Ser. No. 12/270,868, filed on Nov. 14, 2008, for a System And Method For Tagging Code To Determine Where The Code Runs, which is hereby incorporated by reference in its entirety. A more detailed description of validating the code is set forth in Colton et al., U.S. Patent Application Number 12/325,239, filed on Nov. 30, 2008, for a Client-Side And Server-Side Unified Validation, which is hereby incorporated by reference in its entirety.

After server 50 sends the resulting HTML page to the browser 65, at 2 the browser 65 interprets the HTML page and executes the JavaScript within the HTML page. If JavaScript functions tagged to runat="server-proxy" are included, then the present invention automatically strips out the bodies of those functions and replaces the bodies with a new functions by the same name that know how to invoke the original function on the server 50 using Ajax calls and return the result either synchronously or asynchronously. Ajax communications do not need to be written using the present invention. Any functions not tagged with a runat attribute or set to runat="client" or runat="both" are processed by the browser 65.

Any functions set to runat="server-proxy" can now be called from the browser 65. The function is called as if it were running on the browser 65, and the present invention, automatically via XHR communications with the server 50, marshals the parameters to the server 50 where the function executes (calling databases, getting info from the session data, etc. . . . ) and returns the result to the browser 65. The "server-proxy" functions can be invoked either synchronously or asynchronously. At 3, the browser 65 calls the server 50 asynchronously for new information.

The server computer program of the present invention is pre-configured for preferable use as a plug-in to the APACHE 2.x web server. To provide standards-compliant JavaScript and DOM capabilities server-side, the server computer program is built on the MOZILLA engine, which is the same engine used in the popular FIREFOX browser. The server computer program of the present invention is layered into APACHE as an input and output filter for use to modify dynamic pages created by other languages, such as PHP or Ruby.

The server computer program of the present invention is preferably a combination of C/C++ "Core" code and a server-side JavaScript "Framework." The server-core 55 provides the JavaScript parser and runtime, HTML parser and DOM engine, and an event architecture that calls the server-framework 60 as the document is being processed on the server-side 25. The server-framework 60 provides the logic, for example deciding which code to run on the server-side 25 and which on the client-side 30, creating proxies on the client-side 30 for callable server-side functions, serializing and deserializing data, and other related activities. A more detailed description of generating proxies is set forth in Colton et al, U.S. patent application Ser. No. 12/275,182, filed on Nov. 20, 2008, for a System And Method For Auto-Generating JavaScript Proxies And Meta-Proxies, which is hereby incorporated by reference in its entirety.

On the server side 25, a developer's JavaScript environment is enhanced by the server-framework 60, which provides access to the database (e.g., MySQL), file system, network, the HTTP Request and Response data, and the external server-side platforms such as Java, PHP, and Ruby.

An example of code written by a developer and prior to processing by the present invention is set forth below.

```
<html>
    <head>
        <title>Tasks</title>
        <style>
            body { font: 9pt Arial; float: left; }
            .tasks {background-color: #f0f0ff; padding: 8px;}
            .new-task {Padding-bottom: 8px;}
            .task { Padding: 4px; }
        </style>
        <script type="text/javascript" runat="server">
            Var sql = "CREATE TABLE IF NOT EXISTS tasks ( " +
                id int (11) NOT NULL," +
```

```
            "description varchar (255),"+
            "created datetime NOT NULL" +
            ") ENGINE=InnoDB DEFAULT CHARSET=utf8;
         Aptana.DB.execute(sql);
         Window.onserverload = function( )
         {
            var resultSet = Aptana.DB.execute("SELECT * FROM tasks ORDER BY created");
            for (var i=0; i<resultSet.rows.length; i++)
            {
               var task = resultSet.rows[i];
               addTask(task.description, task.id);
            }
         }
         function saveTask(id, description)
         {
            var resultSet = Aptana.DB.execute("SELECT * FROM tasks WHERE id = ?", [id]);
            if (resultSet.rows.length > 0) // task already exists
            {
               Aptana.DB.execute("UPDATE tasks SET description = ? WHERE id = ?",
                  [description, id]);
            }
            else // insert new task
            {
               Aptana.DB.execute("INSERT INTO tasks (id, description, created) " +
                  "VALUES (?, ?, NOW( ))",
                  [id, description]);
            }
         }
         saveTask.proxy = true;
         function $(id) { return document.getElementById(id); }
         $.runat = "both";
         function addTask(description, id)
         {
            var newId = id || Math.ceil(1000000000 * Math.random( ));
            var div = document.createElement("div");
            div.id = "task_" + newId;
            div.className = "task";
            var checkbox = document.createElement("input");
            checkbox.setAttribute("type", "checkbox");
            checkbox.setAttribute("title", "done");
            checkbox.setAttribute("id", "checkbox_" + newId);
            Aptana.setEvent(checkbox, "onclick", "completeTask(" + newId + ")");
            div.appendChild(checkbox);
            var input = document.createElement("input");
            input.setAttribute("type", "text");
            input.setAttribute("size", "60");
            input.setAttribute("title", "description");
            input.setAttribute("id", "input_" + newId);
            input.setAttribute("value", description);
            Aptana.setEvent(input, "onchange", "saveTask(" + newId + ", this.value)");
            div.appendChild(input);
            $("tasks").insertBefore(div, $("tasks").firstChild);
            if (!Aptana.isOnServer)
            {
               saveTask(newId, description);
            }
         }
         addTask.runat = "both";
         function completeTask(taskId)
         {
            var div = $("task_" + taskId);
            div.parentNode.removeChild(div);
            deleteSavedTask(taskId);
         }
         completeTask.runat = "client";
         function deleteSavedTask(id)
         {
            Aptana.DB.execute("DELETE FROM tasks WHERE id = ?", [id]);
         }
         deleteSavedTask.proxy = true;
         </script>
      </head>
      <body>
         <h2>Tasks To Do</h2>
         <div><i>Any changes should be automatically saved to your database!</i><br/><br/></div>
         <div class="new-task">
            New:
            <input type="text" id="txt_new" size="60">
            <input type="button" value="add" onclick="addTask($('txt new').value)">
         </div>
         <div id="tasks" class="tasks">
         </div>
      </body>
</html>
```

Processing of the code by the present invention results in the code being formatted as set forth below:

```
<html>
   <head>
      <script src="/aptana/framework.js?version=0.1.1.759" type="text/javascript"></script>
      <script type="text/javascript">Aptana.clientData=Aptana.Serialization.fromJSONString('{ }');</script>
      <script type="text/javascript">Aptana.Callback.id=-1407728339;</script>
      <title>Tasks</title>
      <style>
      body {
      font: 9pt Arial;
      float: left;
      }
      .tasks {
      background-color: #f0f0ff;
      padding: 8px;
      }
      .new-task {
      padding-bottom: 8px;
      }
      .task {
      padding: 4px;
      }
      </style>
      <script type="text/javascript">
      function $(id)
      {
      return document.getElementById(id);
      }
      function addTask(description, id)
      {
      var newId=id||Math.ceil(1000000000*Math.random( ));
      var div=document.createElement("div");
      div.id="task_"+newId;
      div.className="task";
      var checkbox=document.createElement("input");
      checkbox.setAttribute("type", "checkbox");
      checkbox.setAttribute("title", "done");
      checkbox.setAttribute("id", "checkbox_"+newId);
      Aptana.setEvent(checkbox, "onclick", "completeTask("+newId+")");
      div.appendChild(checkbox);
      var input=document.createElement("input");
      input.setAttribute("type", "text");
      input.setAttribute("size", "60");
      input.setAttribute("title", "description");
      input.setAttribute("id", "input_"+newId);
      input.setAttribute("value", description);
      Aptana.setEvent(input, "onchange", "saveTask("+newId+", this.value)");
```

```
div.appendChild(input);
$("tasks").insertBefore(div, $("tasks").firstChild);
if (!Aptana.isOnServer)
{
    saveTask(newId, description);
}
}
function completeTask(taskId)
{
var div=$("task_"+taskId);
div.parentNode.removeChild(div);
deleteSavedTask(taskId);
}
function saveTask( )
{
return        Aptana.Callback.invokeFunction.call(null,
    "saveTask", arguments);
}
function saveTaskAsync(callback)
{
return  Aptana.Callback.invokeFunctionAsync.call(null,
    callback, "saveTask", arguments);
}
function deleteSavedTask( )
{
return Aptana.Callback.invokeFunction.call(null, "delete-
    SavedTask", arguments);
}
function deleteSavedTaskAsync(callback)
{
return  Aptana.Callback.invokeFunctionAsync.call(null,
    callback, "deleteSavedTask", arguments);
}
</script>
</head>
<body>
<h2>Tasks To Do</h2>
<div>
<i>Any changes should be automatically saved to your
    database!</i>
<br>
<br>
</div>
<div class="new-task">
New:<input id="txt_new" size="60" type="text"><input
    value="add"    onclick="addTask($('txt_new').value)"
    type="button">
</div>
<div id="tasks" class="tasks">
</div>
</body>
</html>
```

FIG. 6 is a screen display 99 of the code set forth above.

Figure 7:
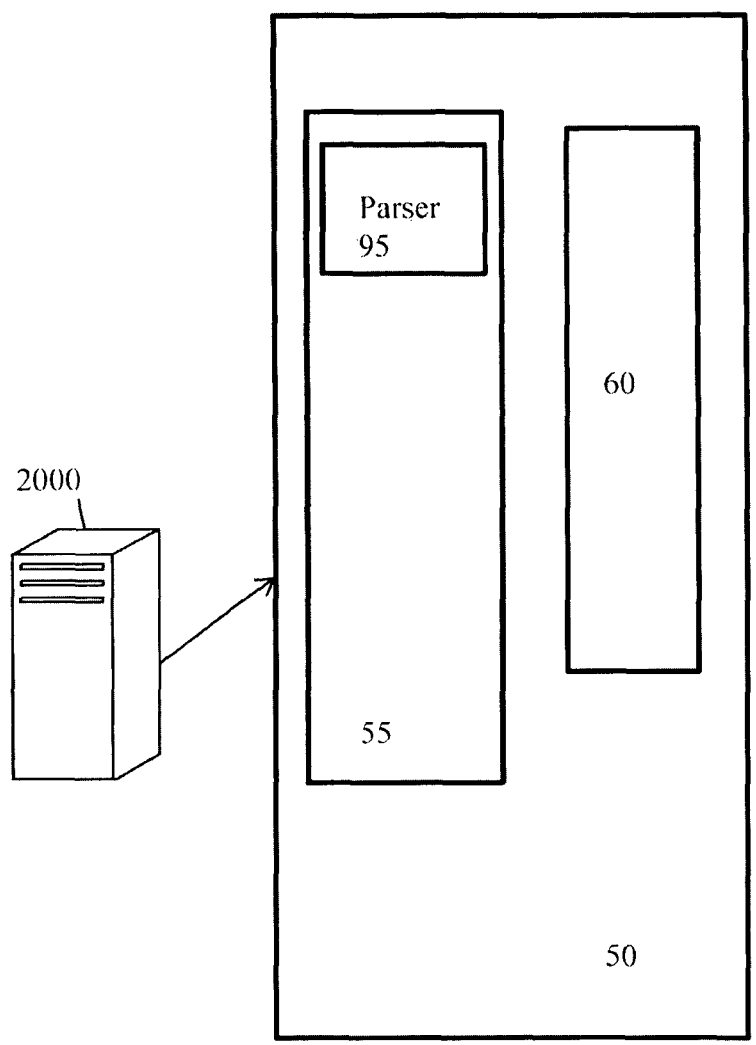
FIG. 7 is a block diagram of the server of the system of the present invention.

As shown in FIG. 7, a server-computer 2000 contains server architecture 50. The server-architecture 50 includes the server-core 55 and the server-framework 60. The server-core 55 includes a JavaScript parser 95. The server-computer 2000 is preferably a conventional server-computer available from IBM, HP, APPLE, DELL, and SUN.

Figure 7A:
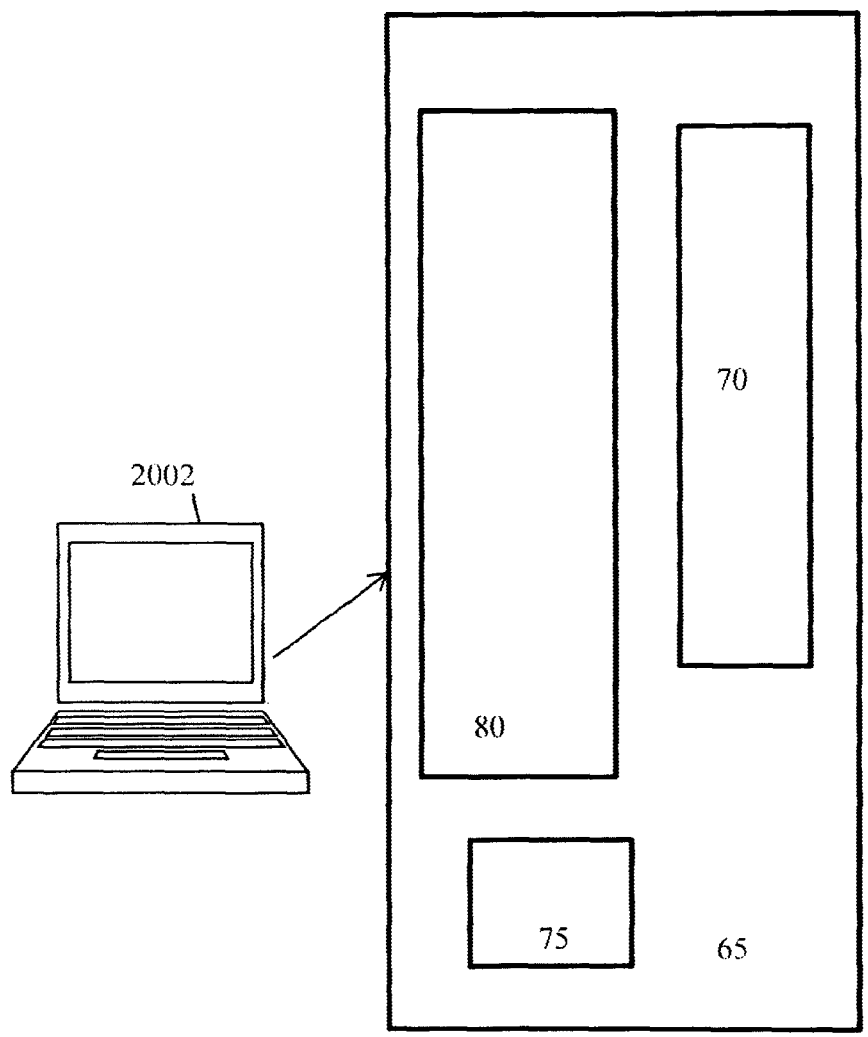
FIG. 7A is a block diagram of the user-computer of the system of the present invention.

As shown in FIG. 7A, a user-computer 2002 contains a Web-browser 65. The Web-browser 65 preferably includes the client framework 70, client-side JavaScript code 75 and the rendering engine 80. The user-computer 2002 is preferably a conventional user-computer such as a PC available from HP, DELL, and GATEWAY, or a MAC available from APPLE. The Web-browser 65 is preferably MICROSOFT INTERNET EXPLORER, NETSCAPE, APPLE SAFARI, MOZILLA FIREFOX, or OPERA.

Figure 8:
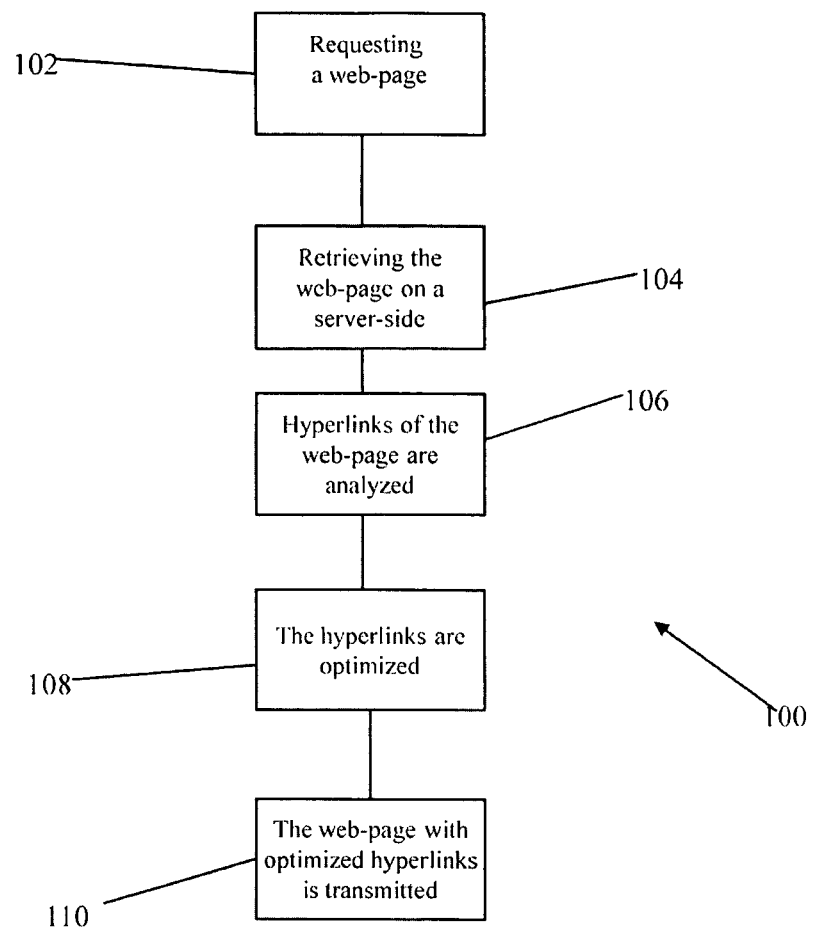
FIG. 8 is a flow chart of a general method of the present invention.

A general method 100 of the present invention is shown in FIG. 8. At block 102, a request for a web-page is transmitted from a client-side. At block 104, the web-page is retrieved at a server side. The web-page comprises hyperlinks. At block 106, the hyperlinks of the web-page are analyzed at the server-side. At block 108, the hyperlinks of the web-page are optimized without affecting an original code of the web-page to generate an optimized web-page. At block 110, the optimized web-page is transmitted to the client-side.

Figure 9:
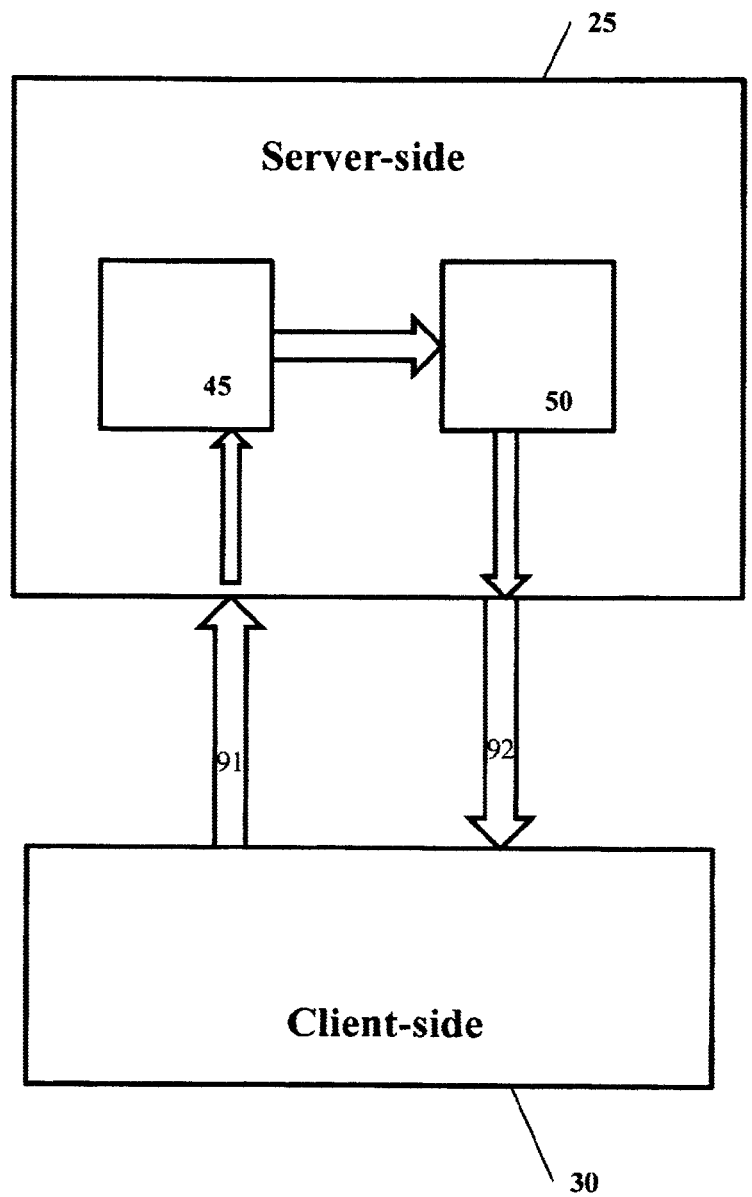
FIG. 9 is a block diagram of an embodiment of the flow of information utilizing the present invention.

FIG. 9 illustrates a flow of requests and responses utilizing the present invention. A request 91 is transmitted from a client-side 30. The request 91 is preferably for an HTML document comprising a plurality of hyperlinks or pseudo-hyperlinks (JavaScript event handlers that cause link-like behavior). The plurality of hyperlinks and/or pseudo-hyperlinks are either long, present in multiple pages of a Web-Application, pertain to a server under a heavy load and/or pertain to a file or site with a security concern. The request 91 is sent to a server-side 25 and sent to an application server 45. The application server 45 transmits a response to the client-side 30 through a script server architecture 50. The script server architecture 50, on-the-fly, processes the HTML document before the response 92 is sent to the client-side/browser 30. The processing at the script server architecture 50 comprises shortening the hyperlink, or pseudo-hyperlink, shifting the load to a different server, rerouting because of a security concern, and/or generally optimizing the hyperlink. The processing is accomplished without altering the original Web-application maintained at the application server 45. An additional explanation of on-the-fly post processing is disclosed in Colton et al., U.S. patent application Ser. No. 12/325,240, filed on Nov. 30, 2008, for On-The-Fly, Post-Processing Of HTML Streams, which is hereby incorporated by reference in its entirety.

An example of code to redirect to another URL is set forth below:

```
<html>
    <head>
        <script type="text/javascript" runat="server">
            window.onserverload = function( ) {
                Jaxer.response.redirect("/login/");
            };
        </script>
    </head>
</html>
```

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for on-the-fly rewriting of a plurality of URLs in a webpage, the method comprising:
   receiving a request for a webpage from a client-side of a network;
   retrieving the webpage at a server-side of the network, the webpage comprising a plurality of hyperlinks, an original code that includes code that is tagged to be performed by the client-side, and one or more functions set to run at the server-side;
   analyzing the plurality of hyperlinks of the webpage at the server-side, wherein the analyzing comprises parsing the webpage at the server-side;
   optimizing the plurality of hyperlinks of the webpage without affecting the original code of the webpage to generate an optimized webpage at the server-side;
   identifying a first function of the one or more functions that is set to run at the server-side and also set to run at the client-side and not stripping the code of the first function;
   stripping code from at least one of the one or more functions set to run at the server-side and not also set to run at the client-side;
   transmitting the optimized webpage with the original code, and without the code that was stripped from the at least one function, from the server-side to the client-side over the network; and
   performing the code that is tagged to be performed by the client-side.

2. The method according to claim 1 wherein the plurality of hyperlinks comprises a plurality of pseudo-hyperlinks.

3. The method according to claim 1 wherein the step of optimizing the plurality of hyperlinks of the webpage comprises substituting shorter links for each of the plurality of hyperlinks.

4. The method according to claim 1 wherein the step of optimizing the plurality of hyperlinks of the webpage comprises changing each of the plurality of hyperlinks to shift a load to at least one different server.

5. The method according to claim 1 wherein the step of optimizing the plurality of hyperlinks of the webpage comprises rerouting at least one of the plurality of hyperlinks.

6. The method according to claim 1 wherein the plurality of hyperlinks comprises a plurality of pseudo-hyperlinks and the optimizing the plurality of hyperlinks of the webpage comprises substituting shorter links for each of the plurality of pseudo-hyperlinks.

7. The method according to claim 1 wherein the original code is JavaScript Code.

8. The method according to claim 1 wherein a first function of the one or more functions set to run at the server-side comprises a runat attribute set to "server" and the code of the first function is stripped and a second function of the one or more functions set to run at the server-side comprises a runat attribute set to "both," and the code of the second function is not stripped.

9. A computer program fixed on a non-transitory computer readable medium of a server for on-the-fly rewriting of a plurality of URLs in a webpage, wherein the computer program, when executed by the server, causes the server to:
   retrieve a webpage comprising a plurality of hyperlinks, an code tagged to be performed by a client-side of a network, and one or more functions set to run at a server-side of the network;
   analyze the plurality of hyperlinks of the webpage and parse the webpage at the server-side of the network;
   optimize the plurality of hyperlinks of the webpage without affecting the code tagged to be performed by the client-side of the network to generate an optimized webpage on the server-side;
   remove code from at least one of the one or more functions set to run at the server-side and not remove code of a first function of the one or more functions because the first function comprises a runat attribute set to "both"; and
   transmit the optimized webpage with the code tagged to be performed by the client-side of the network, and without the code that was removed from the at least one function, over the network from the server-side to a web-browser of the client-side of the network.

10. The computer program according to claim 9 that, when executed by the server, causes the server to reroute at least one of the plurality of hyperlinks.

11. The computer program according to claim 9 that, when executed by the server, causes the server to change each of the plurality of hyperlinks to shift a load to at least one different server.

12. The computer program according to claim 9 that, when executed by the server, causes the server to substitute shorter links for each of the plurality of hyperlinks.

13. A system for on-the-fly rewriting of a plurality of URLs in a webpage, the system comprising:
   a first server computer located on a server-side of a network and being configured to:
   receive a request over the network from a web browser on a client-side of the network for a webpage that includes a plurality of hyperlinks, an original code that includes code that is tagged to be performed by the client-side and code that is tagged to be performed by only the server-side; and
   process code that is tagged to be performed by the server-side to serve the webpage to the web browser over the network, the code including one or more functions executable by at least one of the server-side and the client-side; and
   a second server computer located on the server-side of the network and being configured to:
   retrieve the webpage from the first server,
   analyze the plurality of hyperlinks of the webpage by parsing the webpage at the server-side of the network,
   optimize the plurality of hyper links of the webpage without affecting the code that is tagged to be performed by the client-side to generate an optimized webpage on the server-side of the network,
   identify a first function of the one or more functions that is set to run at the server-side and also set to run at the client-side and not strip the code of the first function,
   strip code from at least one of the one or more functions set to run at the server-side and not also set to run at the client-side, and
   transmit the optimized webpage with the code that is tagged to be performed by the client-side from the server-side to the web browser on the client-side over the network, wherein one of the first or second server computers is further configured to strip the code that is tagged to be performed by only the server-side.

14. The system according to claim 13 wherein the plurality of hyperlinks comprises a plurality of pseudo-hyperlinks.

15. The system according to claim 13 wherein the second server is configured to substitute shorter links for each of the plurality of hyperlinks.

16. The system according to claim 13 wherein the second server is configured to change each of the plurality of hyperlinks to shift a load to at least one different server.

17. The system according to claim 13 wherein the second server is configured to reroute at least one of the plurality of hyperlinks.

18. The system of claim 13 wherein the first server comprises the second server.

\* \* \* \* \*